(12) United States Patent
Curtis

(10) Patent No.: US 11,780,103 B2
(45) Date of Patent: Oct. 10, 2023

(54) FIBER RIBBON SEPARATION TOOL

(71) Applicant: Prysmian S.p.A., Milan (IT)

(72) Inventor: Jesse Curtis, Lexington, SC (US)

(73) Assignee: Prysmian S.p.A., Milan (IT)

( * ) Notice: Subject to any disclaimer, the term of this patent is extended or adjusted under 35 U.S.C. 154(b) by 233 days.

(21) Appl. No.: 17/173,906

(22) Filed: Feb. 11, 2021

(65) Prior Publication Data

US 2022/0250265 A1  Aug. 11, 2022

(51) Int. Cl.
*B26B 5/00* (2006.01)
(52) U.S. Cl.
CPC .................................... *B26B 5/008* (2013.01)
(58) Field of Classification Search
CPC ................................ B26D 5/008; Y10T 83/04
USPC ................. 30/90.4, 90.1, 90.8, 90.7; 84/9.8; 385/134; 81/9.4
See application file for complete search history.

(56) References Cited

U.S. PATENT DOCUMENTS

| | | | | |
|---|---|---|---|---|
| 2,683,308 | A * | 7/1954 | Cook, Jr. | H02G 1/1217 30/91.1 |
| 2,721,384 | A * | 10/1955 | Bell | H02G 1/1217 30/294 |
| 5,524,166 | A | 6/1996 | Osaka et al. | |
| 6,091,875 | A | 7/2000 | Lindsay, Jr. et al. | |
| 8,412,014 | B2 | 4/2013 | Sato et al. | |
| 2006/0096428 | A1 * | 5/2006 | Garcia | B27G 19/08 83/477.2 |
| 2008/0260343 | A1 | 10/2008 | Quinn et al. | |
| 2013/0133204 | A1 * | 5/2013 | McDannell | H02G 1/1217 30/90.8 |
| 2014/0215830 | A1 * | 8/2014 | Ducret | H02G 1/1217 30/90.9 |

FOREIGN PATENT DOCUMENTS

| | | |
|---|---|---|
| EP | 0650237 A2 | 10/1994 |
| JP | S63279203 A | 11/1988 |
| WO | 9857210 A1 | 12/1998 |

OTHER PUBLICATIONS

Extended European Search Report. EP Application No. 22152815.1, dated Apr. 7, 2022, 8 pages.

* cited by examiner

*Primary Examiner* — Phong H Nguyen
(74) *Attorney, Agent, or Firm* — Slater Matsil, LLP

(57) ABSTRACT

A fiber-separation tool including a body with a channel located on a face of the body. The channel is defined by a first sidewall and a second sidewall. The channel is configured to receive an optical fiber ribbon. And, the fiber-separation tool comprises a first blade disposed in the channel with a cutting edge of the first blade. The first blade is configured to separate the optical fiber ribbon into a first portion comprising a first number of optical fibers and a second portion comprising a second number of optical fibers as the optical fiber ribbon is conveyed through the channel.

20 Claims, 16 Drawing Sheets

1300

```
┌─────────────────────────────────────────────────────────────────────┐
│ Fit the optical fiber ribbon into a channel of a fiber-separation   │
│ tool around a first blade located in the channel and a second       │
│ blade located in the channel                                        │
│                              1302                                   │
└─────────────────────────────────────────────────────────────────────┘
                                  ↓
┌─────────────────────────────────────────────────────────────────────┐
│ Arrange the optical fiber ribbon in the channel so the first blade  │
│ is positioned between the first portion and the second portion and  │
│ the second blade is positioned between the second portion of the    │
│ optical fiber and the third portion of the optical fiber            │
│                              1304                                   │
└─────────────────────────────────────────────────────────────────────┘
                                  ↓
┌─────────────────────────────────────────────────────────────────────┐
│ Convey the optical fiber ribbon lengthwise through the channel to   │
│ slice through a bonding material binding the first portion of the   │
│ optical fiber ribbon to the second portion of the optical fiber     │
│ ribbon and to slice through a bonding material binding the second   │
│ portion of the optical fiber ribbon to the third portion of the     │
│ optical fiber ribbon.                                               │
│                              1306                                   │
└─────────────────────────────────────────────────────────────────────┘
```

FIG. 13

FIBER RIBBON SEPARATION TOOL

TECHNICAL FIELD

The present invention relates generally to a method of separating optical fibers and an optical fiber separation tool, and, in particular embodiments, to a method of separating optical fibers using a fiber separation tool.

BACKGROUND

Optical fibers are very small diameter glass strands capable of transmitting an optical signal. Optical cables typically include many optical ribbons bundled together as a single cable. Each optical ribbon may include several optical fibers.

Optical fibers provide advantages over conventional communication lines. Optical-fiber communication networks can transmit significantly more information at significantly higher speeds than is possible with traditional wire-based networks. Optical cables are therefore widely used in long distance communication and have replaced other technologies such as satellite communication, standard wire communication, etc. Besides long distance communication, optical fibers are also used in many applications such as medicine, aviation, computer data servers, etc.

With increased demand for faster transmission of larger amounts of information, there is increased demand for optical cables. The large number of optical fibers makes the process of separating the optical fibers tedious and time-consuming.

SUMMARY

In accordance with an embodiment, a fiber-separation tool includes a body; a channel disposed on a face of the body, the channel being defined by a first sidewall and a second sidewall opposite the first sidewall, the channel being configured to receive an optical fiber ribbon comprising a plurality of optical fibers bonded parallel to each other; and a first blade disposed in the channel with a cutting edge of the first blade being disposed at a first distance from the first sidewall and the cutting edge being disposed at a second distance from the second sidewall, the first blade being configured to separate the optical fiber ribbon into a first portion comprising a first number of optical fibers of the plurality of optical fibers and a second portion comprising a second number of optical fibers as the optical fiber ribbon is conveyed from an entrance of the channel to an exit of the channel, a width of the first portion being approximately equal to the first distance and a width of the second portion being approximately equal to the second distance.

In accordance with an embodiment, a method to separate an optical fiber ribbon including a plurality of optical fibers into a first portion, a second portion, and a third portion, includes: fitting the optical fiber ribbon into a channel of a fiber-separation tool around a first blade located in the channel and a second blade located in the channel; arranging the optical fiber ribbon in the channel so the first blade is positioned between the first portion and the second portion and the second blade is positioned between the second portion of the optical fiber and the third portion of the optical fiber; and conveying the optical fiber ribbon lengthwise through the channel to slice through a bonding material binding the first portion of the optical fiber ribbon to the second portion of the optical fiber ribbon and to slice through a bonding material binding the second portion of the optical fiber ribbon to the third portion of the optical fiber ribbon.

In accordance with an embodiment, a fiber-separation tool includes a body; a channel disposed on a face of the body, the channel being defined by a first sidewall and a second sidewall opposite the first sidewall, the channel being configured to receive an optical fiber ribbon comprising a plurality of optical fibers bonded parallel to each other; a first blade disposed in the channel with a cutting edge of the first blade being disposed at a first distance from the first sidewall and the cutting edge being disposed at a second distance from the second sidewall, the first blade being configured to separate the optical fiber ribbon into a first portion comprising a first number of optical fibers of the plurality of optical fibers and a second portion comprising a second number of optical fibers as the optical fiber ribbon is conveyed from an entrance of the channel to an exit of the channel, a width of the first portion being approximately equal to the first distance and a width of the second portion being approximately equal to the second distance; a second blade disposed in the channel with a cutting edge of the second blade being disposed at a third distance from the first sidewall and the cutting edge being disposed at a fourth distance from the second sidewall, the second blade being configured to separate a third portion comprising a third number of optical fibers of the plurality of optical fibers from the second portion as the optical fiber ribbon is conveyed from the entrance of the channel to the exit of the channel, a width of the third portion being approximately equal to the third distance; and a lid configured to fit into the channel to secure an alignment of the optical fiber ribbon in the channel.

BRIEF DESCRIPTION OF THE DRAWINGS

For a more complete understanding of the present invention, and the advantages thereof, reference is now made to the following descriptions taken in conjunction with the accompanying drawings, in which:

FIG. 13 is a flow chart illustrating a method 1300 to separate an optical ribbon into a first portion, a second portion, and a third portion of an embodiment.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Optical fibers are very small diameter glass strands capable of transmitting an optical signal. Optical cables typically include many optical ribbons bundled together as a single cable. Each optical ribbon may include any number of optical fibers.

Typically, the optical cable is shipped intact to the field for installation. Once there, a service technician is required to splice the cable and separate the optical ribbon into individual optical fibers or sections of optical fibers each section comprising a number of optical fibers (for example sections may comprise 4 optical fibers). This may require separating the optical fibers into individual strands or into groups of optical fibers. For example, a 12-fiber ribbon of optical fiber may need to be separated into 12 single strands, 6 groups having two strands each, 3 groups having four strands each or other arrangement. This may be necessary for splicing together groups of optical fibers. However, because each optical cable has a large number of optical fibers, the separation process can be both tedious and time-consuming.

Accordingly, there is a need for an improved tool that can efficiently separate the optical fibers without need for specialized training to allow service technicians of varying levels of experience to easily and efficiently separate the optical fibers without damaging the optical fibers. It also may be advantageous to have an improved mechanical devices and methods for separating fibers when solutions involving chemical separation are not desired.

Various embodiments of the present invention disclose a fiber separation tool that can be used to safely separate optical fibers of an optical ribbon and methods of using the same.

Figure 1A:
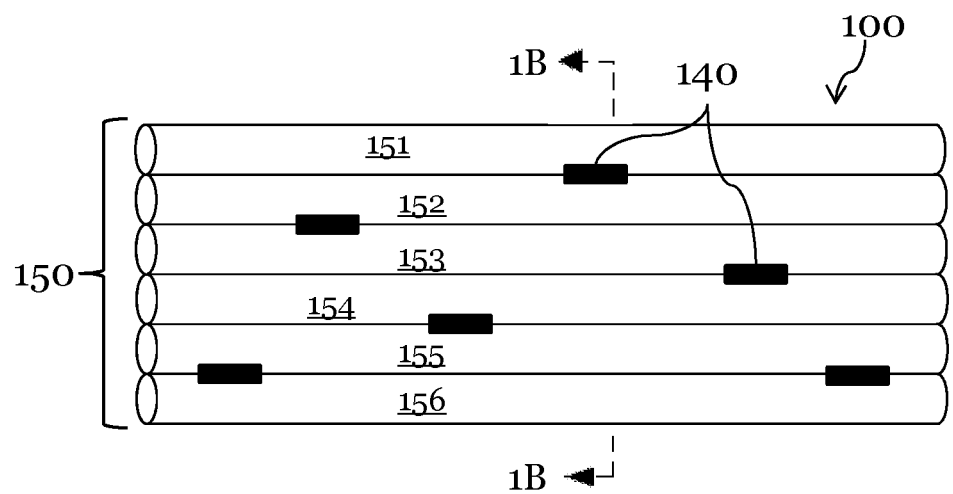
FIG. 1A illustrates a projection view of an array of optical fibers forming a ribbon.
Figure 1B:
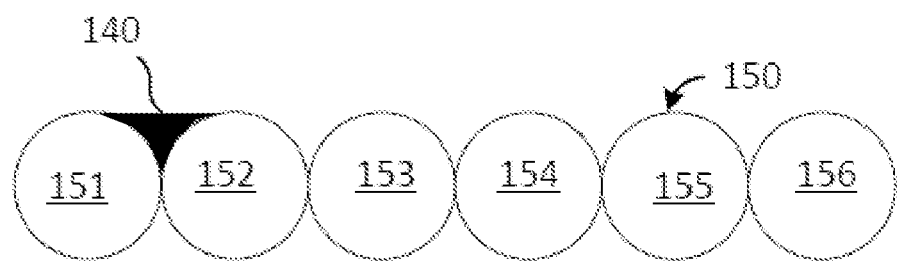
FIG. 1B illustrates a corresponding cross-sectional area of the array of optical fibers illustrated in FIG. 1A.

FIG. 1A illustrates a projection view of an array of optical fibers forming a ribbon, and FIG. 1B illustrates a corresponding cross-sectional area of the array of optical fibers illustrated in FIG. 1A.

FIG. 1A illustrates a ribbon 100, such as a ribbon cable. The ribbon 100 includes a plurality of optical fibers 150, such as a first, a second, a third, a fourth, a fifth, and a sixth optical fiber 151-156. Though six optical fibers 150 are illustrated in FIG. 1A, more or fewer optical fibers may be included in the ribbon 100. For example, the ribbon 100 may include 12 fibers or any other number of fibers desired. The optical fibers 150 may each have a coating and optionally an ink layer.

The optical fibers 151-156 are arranged parallel to one another and may be connected to neighboring optical fibers using a bonding material 140. The bonding material 140 may be a substantially cured ribbon-matrix material having elongation-to-break and modulus characteristics that promote reversible folding and/or rolling of the ribbon 100. The bonding material 140 may include ultraviolet (UV) acrylate. In other embodiments, the bonding material 140 may include low-modulus elastomers and silicones, such as UV-curable silicones and RTV silicones (i.e., room-temperature-vulcanization silicone). The UV-cured silicones have some advantages over RTV silicones, including faster curing and reduced shrinkage. In addition, unlike UV-cured silicones, RTV silicones require exposure to humidity and high temperatures for extended time periods and can generate unwanted byproducts (e.g., acetic acid) during curing. Suitable UV-curable silicones include LOCTITE® SI 5240™ UV-cured silicone and Addisil UV-cured silicones (e.g., UV 50 EX, UV 60 EX, and UV 70 EX). The bonding material 140 is not limited to these materials; other materials for bonding optical fibers as known to persons of ordinary skill in the art may also be used.

The bonding material 140 may be arranged across the ribbon 100 so as to selectively leave a large surface of the optical fibers 150 free of the bonding material 140. In various embodiments, the ribbon may comprise a flexible ribbon. For example, in the cross-sectional view of FIG. 1B, the bonding material 140 is formed between the first optical fiber 151 and the second optical fiber 152, and no bonding material is formed between the other optical fibers 152-156 at this cross-section. This may allow optical fibers 150 maintain a large degree of freedom and can be effectively folded or otherwise randomly positioned when the ribbon 100 is subjected to external stress, for example. In various embodiments, the optical fibers 150 can be folded into a densely packed configuration. In one or more embodiments, the folded optical fibers 150 may have a non-circular or irregular shape. Different bonding arrangements may also be utilized for ribbons. For example, optical fibers 151-156 may be bonded by sections of bonding material 140 adjacent to each other. In various embodiments all of the fibers of a ribbon may be bonded together by adjacent sections of bonding material forming a column of bonding material spanning the full width of a ribbon.

Figure 1C:
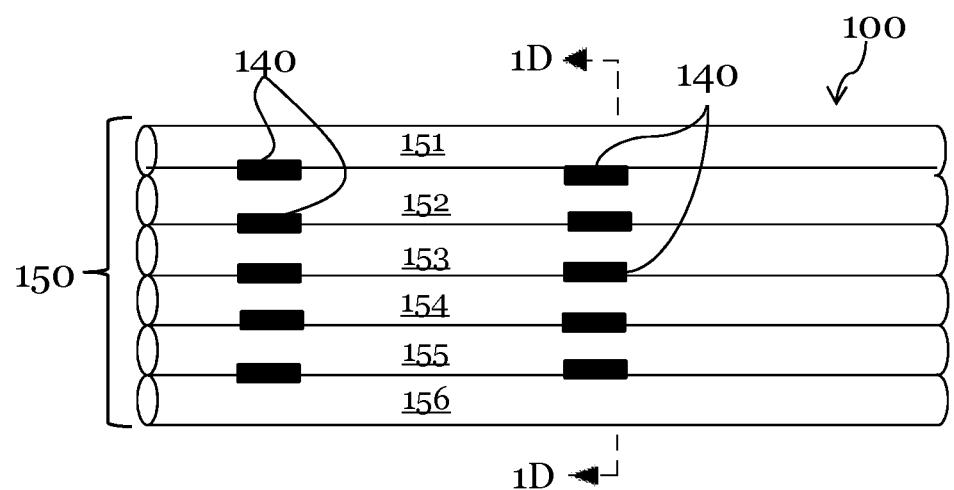
FIG. 1C illustrates a projection view of an array of optical fibers forming a ribbon.
Figure 1D:
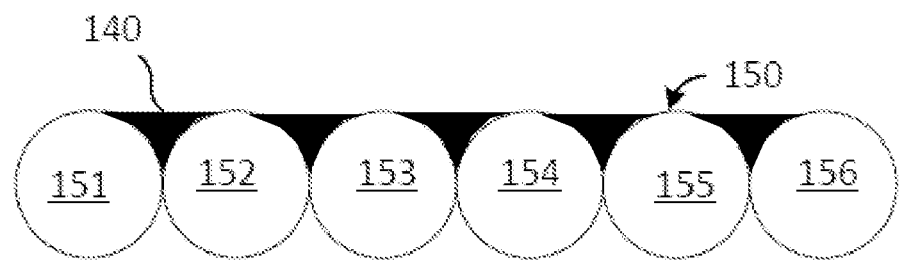
FIG. 1D illustrates a corresponding cross-sectional area of the array of optical fibers illustrated in FIG. 1C.

FIG. 1C illustrates a projection view of an array of optical fibers forming a ribbon, and FIG. 1D illustrates a corresponding cross-sectional area of the array of optical fibers illustrated in FIG. 1C.

FIG. 1C demonstrates bonding material 140 arranged adjacently on a ribbon 100 to bind the optical fibers to form columns. The columns of bonding material may be separated at regular intervals on the fiber ribbon. FIG. 1D depicts a cross section of the ribbon 100 of FIG. 1C at a column of bonding material.

Ribbons may also be bonded in other ways. For example, bonding material 140 may be arranged in a saw-teeth, zig-zag, or sinusoidal pattern on a ribbon 100.

Figure 1E:
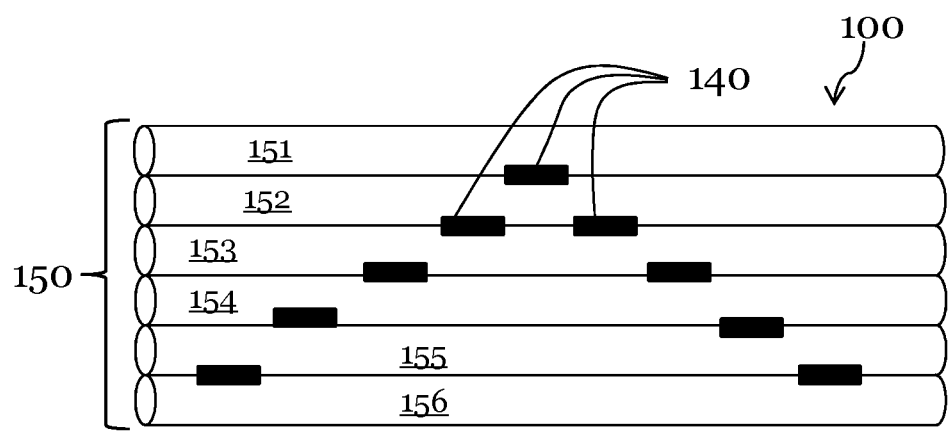
FIG. 1E illustrates a projection view of an array of optical fibers forming a ribbon.

FIG. 1E illustrates a projection view of an array of optical fibers forming a ribbon.

FIG. 1E depicts a ribbon 100 with bonding material 140 arranged in a sinusoidal pattern. The pattern depicted in FIG. 1E may be repeated along the length of a ribbon, which is also true of the patterns depicted in FIG. 1A and FIG. 1C.

Figure 1F:
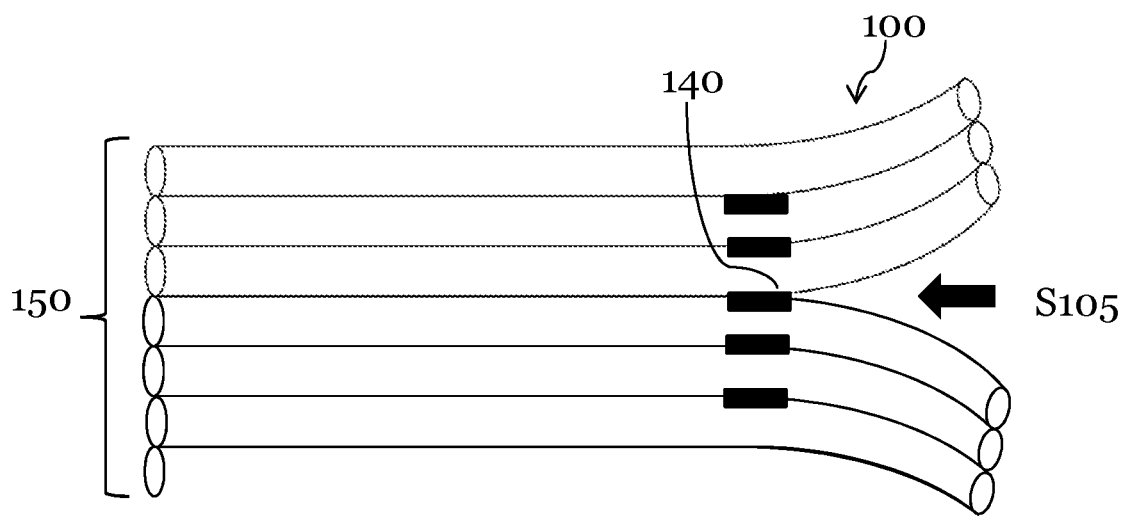
FIG. 1F and FIG. 1G illustrate a process for separating neighboring optical fibers of a ribbon according to embodiments of the present invention.
Figure 1G:
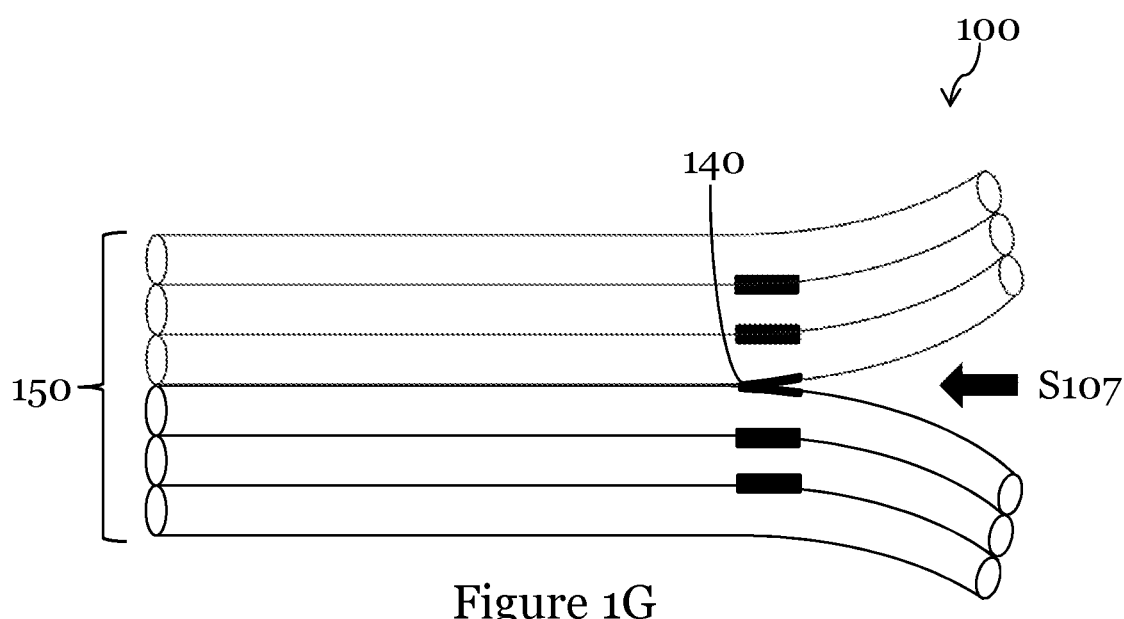

FIG. 1F and FIG. 1G illustrate a process for separating neighboring optical fibers of a ribbon.

FIG. 1F illustrates a first separation step S105 for separating optical fibers 150 (such as optical fibers 151-156) from each other. The separation step S105 may start at any region of the ribbon 100 where the surface between adjacent optical fibers is free of bonding material 140. During step S105, the optical fibers 150 may be separated and spread out. In an embodiment, a service technician may begin the process of spreading the optical fibers 150 manually when placing the ribbon 100 in a configuration such as that shown in FIG. 1F. As will be further described herein, a separation tool also may be used to assist separation of the optical fibers 150. In particular, the separation tool may facilitate the movement of the optical fibers 150 around a blade of the separation tool so that individual ones of the optical fibers 150 are not cut or damaged by the blade of the separation tool.

FIG. 1G illustrates a second separation step S107 in which the bonding material 140 is cut through causing adjacent ones of the optical fibers 150 to separate without damaging the optical fibers 150. As will be further described herein, a separation tool enables cutting through the bonding material 140 attaching adjacent ones of the optical fibers 150 without cutting or damaging the optical fibers 150.

Figure 2:
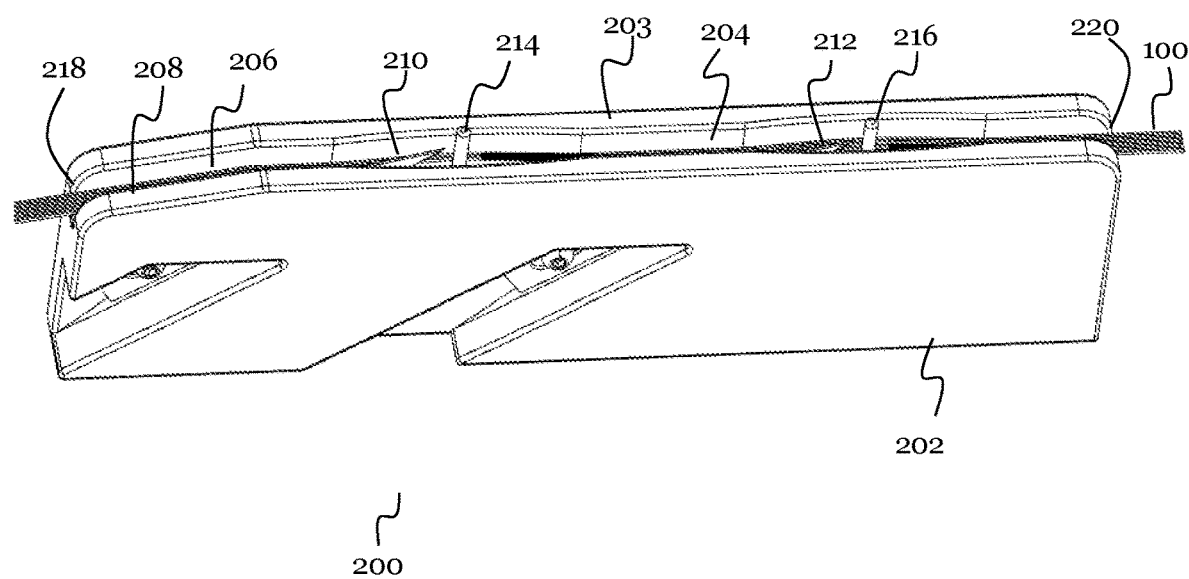
FIG. 2 depicts a perspective view of a tool for separating optical fibers of an embodiment.

FIG. 2 depicts a perspective view of a tool for separating optical fibers of an embodiment.

In various embodiments, an optical-fiber separation tool 200 may comprise a body 202. The body 202 may comprise different shapes or sizes in various embodiments. The body 202 of the optical-fiber separation tool may be ergonomically shaped to accommodate use by technicians. The body 202 may also be sized to fit in a tool belt, pocket or other means for transportation. The body 202 may be formed from plastic, resin, nylon, polypropylene, polylactic acid, carbon, metal, alloy metal, composite or any other suitably rigid material. The body 202 may be formed may be formed as an integral monolithic component, for example, using 3-D printing.

The optical-fiber separation tool may further comprise a channel 204. The channel 204 may disposed on a surface 203 of the body 202. The channel 204 may be configured to receive a ribbon 100. The width of the channel 204 may be approximately the same width as size of optical-fiber ribbon. For example, in various embodiments, the width of the channel 204 may be approximately the same size as the width of a ribbon 100 with 12 fibers. The width of the channel 204 may be 100% to 110% in some embodiments. In various embodiments, the channel 204 may be approximately the same width as a 24 fiber optical-fiber ribbon. And, in various embodiments, the width of the channel may comprise other widths. The width of the channel may correspond to a width beneficial to provide a fit for a desired size of ribbon. In various embodiments, the width of the channel may vary over the length of the channel. This may be advantageous to accommodate components of the optical-fiber separation tool 200 located in the channel 204.

The channel 204 may be defined by a first sidewall 206 and a second sidewall 208. The first sidewall 206 may be opposite the second sidewall 208. The first sidewall 206 may be continuous over the full length of the channel. In various embodiments, the first sidewall 206 may have gaps or spaces. The second sidewall 208 may be continuous over the full length of the channel. In various embodiments, the second sidewall 208 may have gaps or spaces.

The optical-fiber separation tool 200 may comprise a first blade 210. The first blade 210 may be disposed in the channel 204. The optical fiber separation tool may comprise a second blade 212 that is disposed in the channel 204. In various embodiments, the optical-fiber separation tool 200 may comprise additional blades disposed in the channel 204.

The optical-fiber separation tool 200 may also comprise a first guide post 214. And, in various embodiments, the optical-fiber separation tool 200 may comprise a second guide post 216. The first guide post 214 may be aligned with the first blade 210 on a longitudinal axis of the channel 204. The second guide post 216 may be aligned with the second blade 212 along a longitudinal axis of the channel 204. The first guide post 214 may be disposed between the first blade 210 and an exit 220 of the channel. The second guide post 216 may be disposed between the second blade 212 and an exit 220 of the channel.

The optical-fiber separation tool 200 may comprise additional guide posts in various embodiments. In various embodiments, the number of guideposts of the optical-fiber separation tool 200 may correspond to the number of blades of the optical-fiber separation tool 200.

The first blade 210, the second blade 212, or both may be made from any material suitable for slicing a bonding material. In various embodiments, the first blade 210 and the second blade 212 may be made of stainless steel. In other embodiments, the first blade 210, second blade 212, or both may comprise steel, or alloys of steel comprising carbon, chromium, cobalt, manganese, nickel, molybdenum, tungsten, and/or vanadium. In various embodiments, the blades may comprise a blade such as a commercially available No. 11 blade or other blade known in the art. Other materials may also be used for the blades in other embodiments.

Figure 3A:
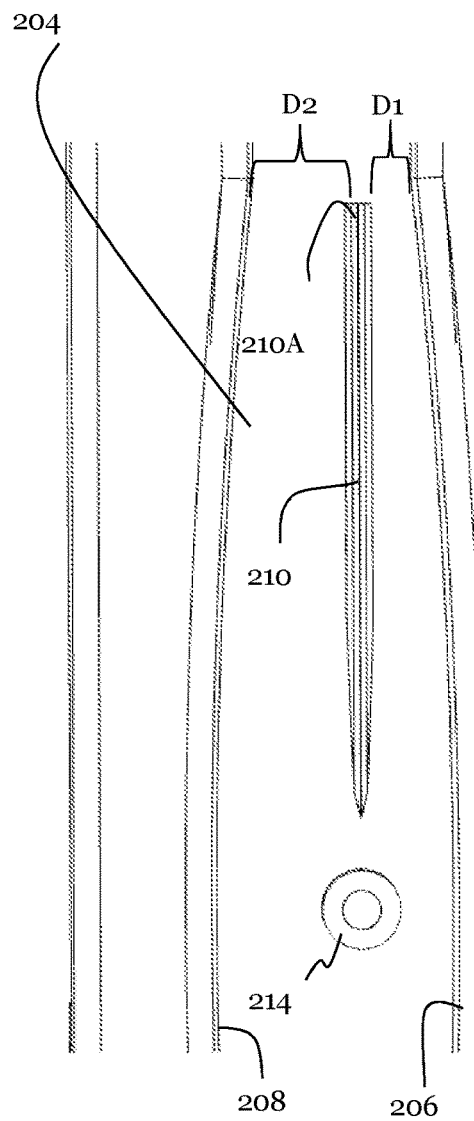
FIG. 3A and FIG. 3B show top down views of the first blade and the second blade of an embodiment.
Figure 3B:
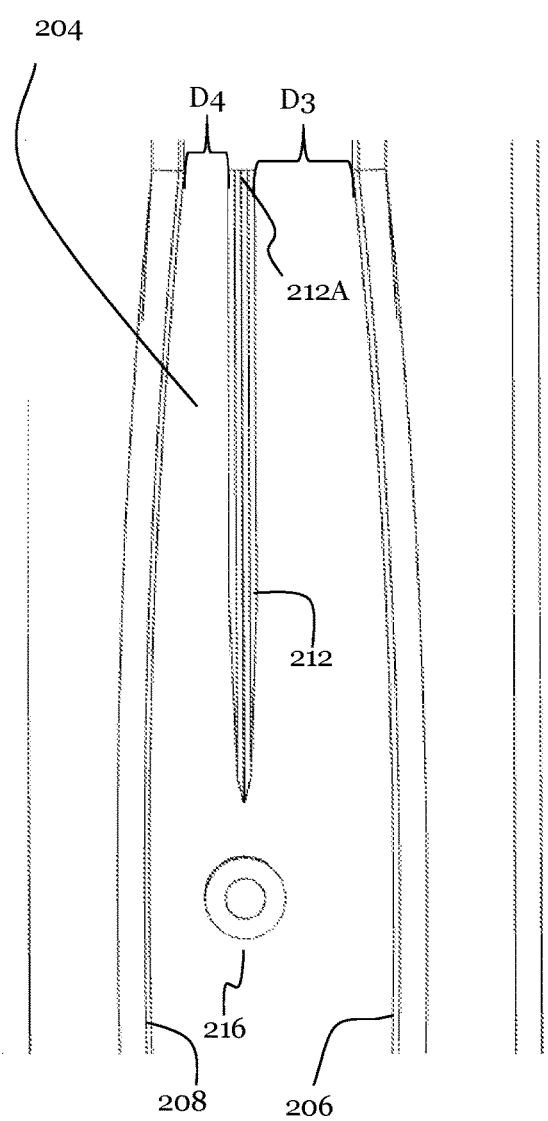

FIG. 3A and FIG. 3B show top down views of the first blade 210 and the second blade 212 of an embodiment.

In various embodiments, a cutting edge 210A of the first blade 210 may be oriented in the channel to face an entrance 218 of the channel. The entrance is not depicted in FIG. 3A or FIG. 3B, but is depicted in FIG. 2. The cutting edge 210A of the first blade 210 may be disposed at a first distance D1 from the first sidewall 206. And, the cutting edge 210A may be disposed at a second distance D2 from the second sidewall 208. The first distance D1 and the second distance D1 may be determined based on a desired width of a portion of the ribbon 100 desired to be cut from the ribbon 100.

For example, for embodiments used to separate 4 optical fibers from a 12-fiber ribbon, the first distance D1 may be determined to correspond to the width of a 4-fiber ribbon. And, the distance D2, may be determined to correspond to the width of an 8-fiber ribbon. As a 12-fiber ribbon is conveyed through the channel 204, the first blade 210 will then slice bonding material between the appropriate two optical fibers to cut the 12-fiber ribbon into a first portion comprising 4 fibers and a second portion comprising 8 fibers.

In various embodiments, the first distance D1 and the second distance D2 may vary to accommodate different widths of ribbon. For example, the first distance D1 and the second distance D2 may be selected to separate a 12-fiber ribbon into two equal portions. In various embodiments, D1 and D2 may be selected to separate a 24-fiber ribbon into a 16-fiber portion and an 8-fiber portion. In various embodiments, other distances for D1 and D2 may be used to accommodate ribbons with different number of fibers. The first distance D1 and the second distance D2 may be different depending on fiber size, or width of bonding material or other factors.

The first guide post 214 may aid the movement of the ribbon through the channel and direct the appropriate optical fibers apart to expose bonding material to the first blade 210 for cutting as the ribbon is conveyed through the channel 204. The size of the first guide post 214 may be determined to create enough lateral space between optical fibers of a ribbon 100 so the bonding material binding them may be cleanly cut. The guidepost may perform the step S105 as a ribbon is conveyed through a channel 204.

The width of the channel 204 may also be increased in the area where the first guide post 214 is located to accommodate the first guide post 214 and maintain room for the first portion of the ribbon 100 and the second portion of the ribbon 100 as the ribbon is conveyed through the channel in the area where the first guide post 214 is located. The first guide post 214 may be disposed at a position in the channel 204 relative to the cutting edge 210A of the first blade 210 so appropriate fibers are separated enough to expose the binding material before reaching the cutting edge 210A of the first blade 210. This may be advantageous to protect damage to the fibers by the first blade 210.

In various embodiments, a second blade 212 may also be disposed in the channel 204. A second blade 212 may be advantageous to cut an additional portion from a ribbon. The cutting edge 212A of the second blade 212 may be disposed at a third distance D3 from the first sidewall 206. And, the cutting edge 212A may be disposed at a fourth distance D4 from the second sidewall 208. The fourth distance D4 may be approximately the width of the third portion of ribbon desired to be separated from the ribbon. Similar to the first distance D1 and the second distance D1, the third distance D3 and the fourth Distance D4 may be determined based on a desired width of a portion of the ribbon 100 desired to be cut from the ribbon 100.

The third distance D3, and the fourth distance D4 may also be determined in coordination with the first distance D1 and the second distance D2 so that a ribbon may be cut into three portions of desired widths and fibers with a single pass of the optical-fiber separation tool 200. The first blade 210 and the second blade 212 may be offset from each other and the first sidewall 206 and second sidewall 208 on a lateral axis of the channel by an amount effective to cut a ribbon into portions of a desired size.

For example, the first distance D1, the second distance D2, the third distance D3, and the fourth distance D4 may be determined to separate a 12-fiber ribbon into three portions, each of the three portions comprising 4 fibers. As will be appreciated, these distances may vary in different embodiments depending on the width of a ribbon, which may be a function of a width of the individual fibers. The first distance D1, and the fourth distance D4 may be approximately equal and the distance between the first blade 210 and the second blade 212 along a lateral axis (the offset) may also be equal. This may allow the ribbon to be split into three equal portions.

As another example, the first distance D1, the second distance D2, the third distance D3, and the fourth distance D4 may be determined to cut a 12-fiber ribbon into a 6-fiber ribbon, and two 3-fiber ribbons. Or, the first distance D1, the second distance D2, the third distance D3, and the fourth distance D4 may be determined to accommodate any other type of cut of a ribbon desired. In different embodiments, the first distance D1, the second distance D2, the third distance D3, and the fourth distance D4 may be determined to be cut different sized ribbons into different portions comprising different numbers of fiber ribbons. The position of the first blade 210 and the second blade 212 may vary in different embodiments in various ways to accommodate different cuts.

The second guide post 216 may also aid the movement of the ribbon through the channel and direct the appropriate optical fibers apart to expose bonding material to the second blade 212 for cutting as the ribbon 100 is conveyed through the channel 204. The size of the second guide post 216 post may be determined to create lateral space between optical fibers of a ribbon 100 so the bonding material may be cleanly cut. The width of the channel 204 may also be increased to accommodate the second guide post 216 and maintain room for the first portion of the ribbon 100, the second portion of the ribbon 100, and the third portion of the ribbon 100 as the ribbon 100 is conveyed through the channel 204 in the area where the second guide post 216 is located. The second guide post 216 may be disposed at a position in the channel 204 relative to the cutting edge 212A of the second blade 212 so appropriate fibers are separated enough to expose the bonding material binding them before it reaches the cutting edge 212A of the second blade 212. This may be advantageous to prevent damage to the fibers by the first blade 210.

In various embodiments, the optical-fiber separation tool 200 may comprise additional blades disposed in the channel 204. Additional blades may be advantageous to cut a ribbon 100 into additional sections in a single pass. For example, a third blade in the channel 204 may allow a 12-fiber ribbon to be cut into four sections having three fibers in each section. The third blade may be offset from the first blade 210 and the second blade 212 along the lateral axis of the channel 204 to accommodate the desired cut.

Figure 4:
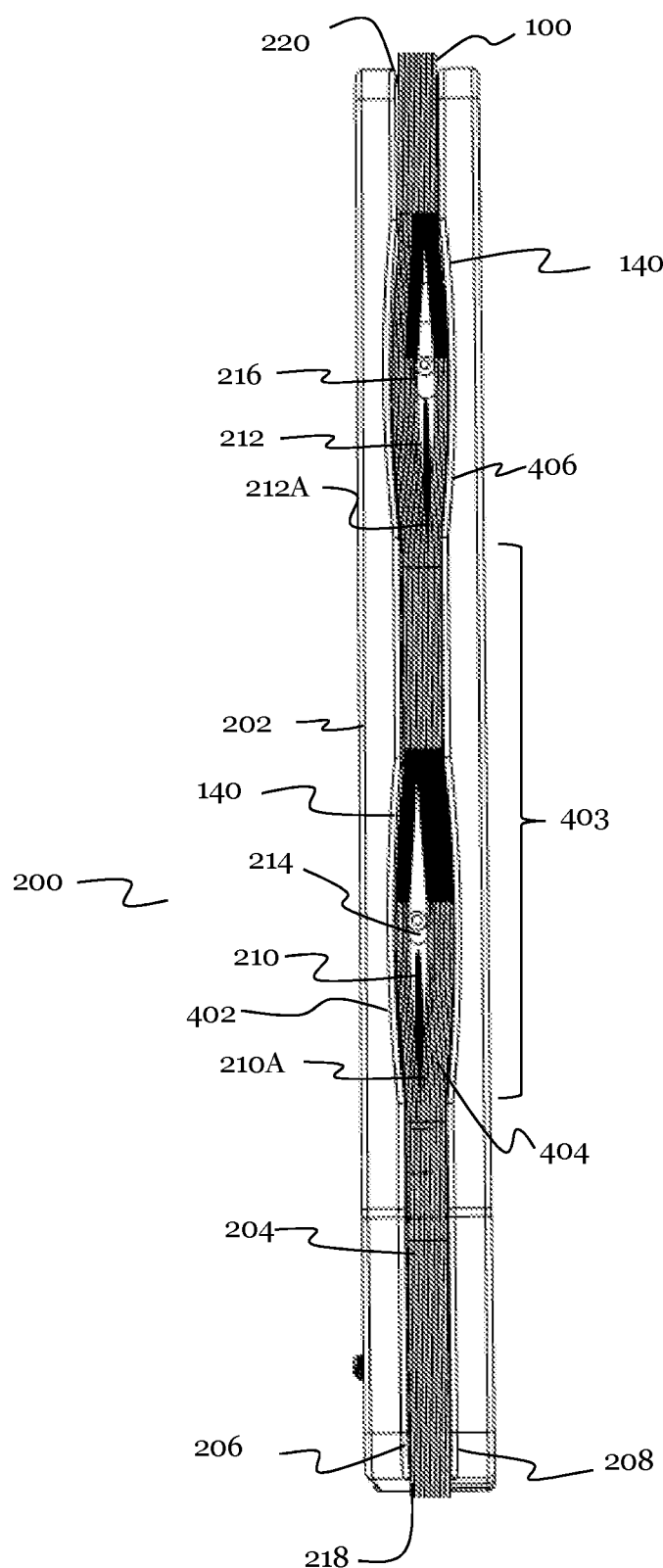
FIG. 4 depicts a top down view of the optical-fiber separation tool.

FIG. 4 depicts a top down view of the optical-fiber separation tool 200.

A ribbon 100 comprising a plurality of optical fibers may be fitted into the channel 204 to separate the ribbon 100. When fitting the ribbon 100 into the channel 204, areas of the ribbon 100 that do not have bonding material 140 may be spread to allow the ribbon 100 to be placed into the channel around the first blade 210 and second blade 212 (if present) and any additional blades. The unbound portions of the fibers may also be spread around the first guide post 214 and the second guide post 216 to align a ribbon in the channel. The blades may be located in the channel at positions that will allow the fiber to be fitted so that the blades are positioned between the appropriate optical fibers to cut the ribbon 100 into the desired portions. For example, the first blade 210 and the second blade 212 may be positioned so that a fourth and fifth fiber of a 12-fiber ribbon may be separated by the first blade 210 and an eighth and ninth fiber of a 12-fiber ribbon may be separated by the second blade 212 for an optical-fiber separation tool 200 that cuts 12-fiber ribbons into three equal portion. However, as discussed above the size of the portions cut by the optical-fiber separation tool 200 by vary in different embodiments.

After a ribbon 100 is fit into the channel 204, the ribbon 100 may be conveyed through the channel 204. The ribbon 100 may be pulled through the channel 204 or the optical-fiber separation tool 200 may be worked over the ribbon 100 to convey the ribbon through the channel 204. As the ribbon is conveyed through the channel 204, the ribbon 100 bonding material 140 may be sliced by the first blade 210 to cut the ribbon into a first portion 402 and a second portion 404 by the first blade 210. In various embodiments, the second blade 212 may slice bonding material at another location to cut a third portion 406 from the second portion 404. Additional blades may cut additional portions in various embodiments.

The first sidewall 206 and the second sidewall 208 may advantageously help maintain the alignment of the ribbon 100 in the channel 204 as it is conveyed through the channel. The first guide post 214 and the second guidepost may also help maintain the alignment of the ribbon in the channel 204 as the ribbon 100 is conveyed through the channel 204. The first distance D1 may be approximately equal to the width of the first portion 402. This may facilitate an alignment of the ribbon 100 in the channel to separate the first portion 402 from the ribbon 100 cleanly and efficiently. The width of the first portion 402 may also correspond to the width of the desired number of optical fibers for the portion. For example, the width of the first portion may be approximately equal to the sum of the diameters of the number of fibers of the first portion 402. For example, if the first portion 402 includes 4 fibers, the width of the first portion 402 and the first distance D1 may be approximately equally to the sum of the diameters of 4 fibers.

The fourth distance D4 may be approximately equal to the width of the third portion 406. This may facilitate an alignment of the ribbon 100 in the channel to separate the third portion 406 from the ribbon 100 cleanly and efficiently. The width of the third portion 406 may also correspond to the width of the desired number of optical fibers for the third portion. For example, the width of the third portion may be approximately equal to the sum of the diameters of the number of fibers of the third portion 406. For example, if the third portion 406 includes 4 fibers, the width of the third portion 406 and the fourth distance D4 may be approximately equally to the sum of the diameters of 4 fibers.

The first blade 210 and the second blade 212 may be offset along a longitudinal axis of the channel 204 by a longitudinal offset distance 403. The longitudinal offset distance 403 may be determined advantageously to allow a ribbon 100 to be fitted into the channel 204. The longitudinal offset distance 403 may be determined so that a ribbon 100 may be aligned in the channel 204. The longitudinal offset may be determined so that unbound regions of a ribbon may be aligned with the blades and guideposts so that fibers may be spread to fit the ribbon around the blades and guideposts. The longitudinal offset may be tailored to the distance between bonding material on a known class of ribbons. For example, if it is known that a given distance separates columns of bonding materials (as depicted in FIG. 1C) the longitudinal offset may be determined so that un-bonded regions of the ribbon can be fitted into the channel between bonded areas of the of the ribbon. This may allow the fibers of the ribbon to spread out for alignment in the channel 204 so that the ribbon may be conveyed through the channel 204. The longitudinal offset distance may correspond to the distance between un-bonded areas of the ribbon 100. The longitudinal offset, in various embodiments, may be tailored to patterns of bonding materials depicted in FIG. 1A, FIG. 1E, or other patterns.

Figure 5:
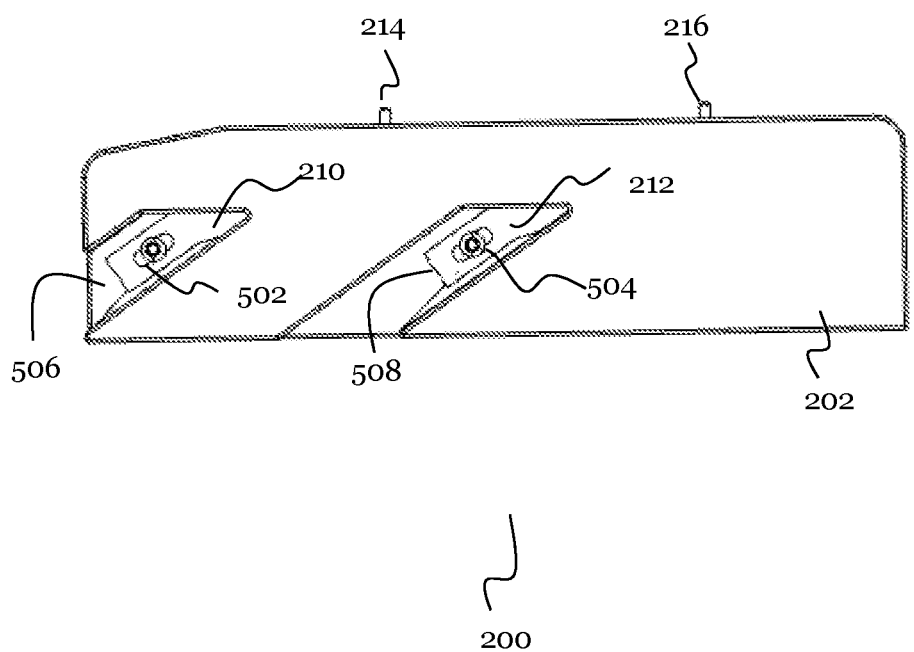
FIG. 5 and FIG. 6 show a side views of the optical-fiber separation tool of an embodiment.
Figure 6:
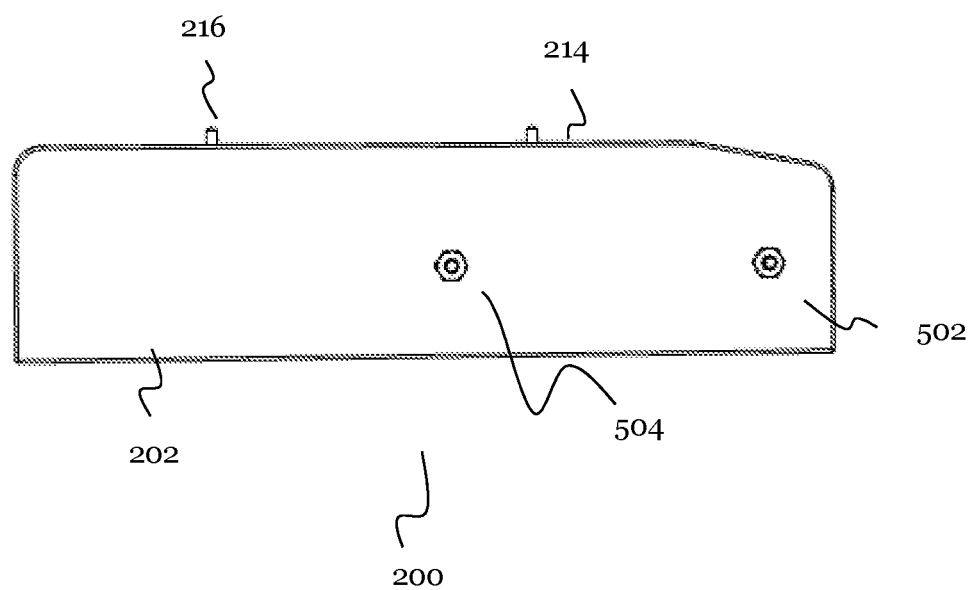

FIG. 5 and FIG. 6 show side views of the optical-fiber separation tool 200 of an embodiment.

In various embodiments of the optical-fiber separation tool 200, the first blade 210 may be removable. This may allow the first blade 210 to be replaced if it becomes worn or damaged during use. The first blade 210 may be secured to the optical-fiber separation tool 200 by a fixing mechanism 502. This may comprise a bolt and nut or other means known in the art. The fixing mechanism 502 may be loosened so the first blade 210 may be removed from the optical-fiber separation tool 200. The channel 204 may comprise an access port (not shown) to allow the first blade 210 to be inserted into the channel 204. A replacement blade may be inserted into the access port and fastened to the optical-fiber separation tool 200 with the fixing mechanism 502. The access port may be located on a floor of the channel 204. When attached, the first blade 510 may fit in a first recessed area 506 disposed on the body 202 of the optical-fiber separation tool 200. It may be advantageous to position the first blade 210 in the recessed area of the body 202 for gripping the optical-fiber separation tool 200. It also may be beneficial to utilize a first recessed area 506 to protect the first blade 210 from damage.

In various embodiments of the optical-fiber separation tool 200, the second blade 212 may be removable. This may allow the second blade 212 to be replaced if it becomes worn or damaged during use. The second blade 212 may be secured to the optical-fiber separation tool 200 by a fixing mechanism 504. This may comprise a bolt and nut or other means known in the art. The fixing mechanism 504 may be loosened so the second blade 212 may be removed from the optical-fiber separation tool 200. The channel 204 may comprise an access port (not shown) to allows the second blade 212 to be inserted into the channel 204. The access port may be located on a floor of the channel 204. A replacement blade may be inserted into the access port and fastened to the optical-fiber separation tool 200 with the fixing mechanism 504. When attached, the second blade 512 may fit in a second recessed area 508 disposed on the body 202 of the optical-fiber separation tool 200. It may be advantageous to position the second blade 212 in the second recessed area 508 of the body 202 for gripping of the optical-fiber separation tool 200. It also may be beneficial to utilize a second recessed area 508 to protect the second blade 212 from damage.

Figure 7:
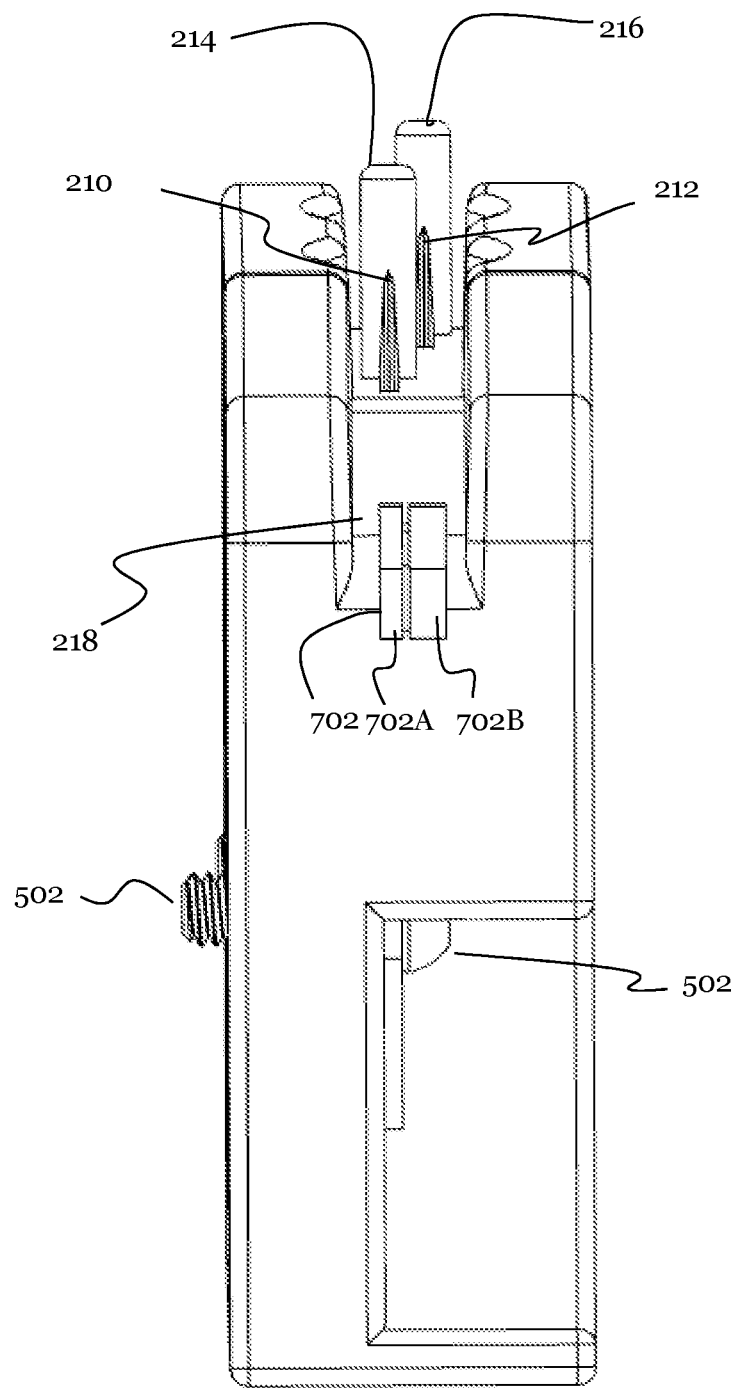
FIG. 7 depicts a view from the entrance of the channel of an optical-fiber separation tool of an embodiment.

FIG. 7 depicts a view from the entrance 218 of the channel 204 of an optical-fiber separation tool 200 of an embodiment.

In various embodiments, the optical-fiber separation tool 200 may comprise a guideway 702. The guideway 702 may be disposed at an entrance 218 of the channel 204. The guideway 702 may have a first track 702A that is aligned with the first blade 210. The first track 702A may be sized to accommodate a smaller section of ribbon 100 than the channel 204 and allow for additional separation. For example, the first track 702A of the guideway 702 may be sized to accommodate a two-fiber ribbon. The two fibers may then be fitted into the channel 204 using the first track 702A and aligned with the first blade 210. The two fiber ribbon may then be separated into two, single-fiber strands by conveying the ribbon through channel 204 past the first blade 210 which will operate to slice bonding material 140 attaching the fibers together. As will be appreciated, the first track 702A may be sized to accommodate ribbons of various sizes in various embodiments.

The second track 702B may be aligned with the second blade 212 to allow additional splits. For example, the second track 702B may be sized to accommodate a 4-fiber ribbon to split the ribbon into two sections, each section having two fibers. In this way, the optical-fiber separation tool 200 may provide a means to separate a 12-fiber ribbon into three four-fiber portions, the second track 702B may allow separation from a 4-fiber ribbon into a two-fiber ribbon, and the first track 702A may allow separation from a two-fiber ribbon into single fibers. Again, however, the second track 702B may be sized to accommodate a ribbon comprising a different number of fibers in various embodiments.

Figure 8:
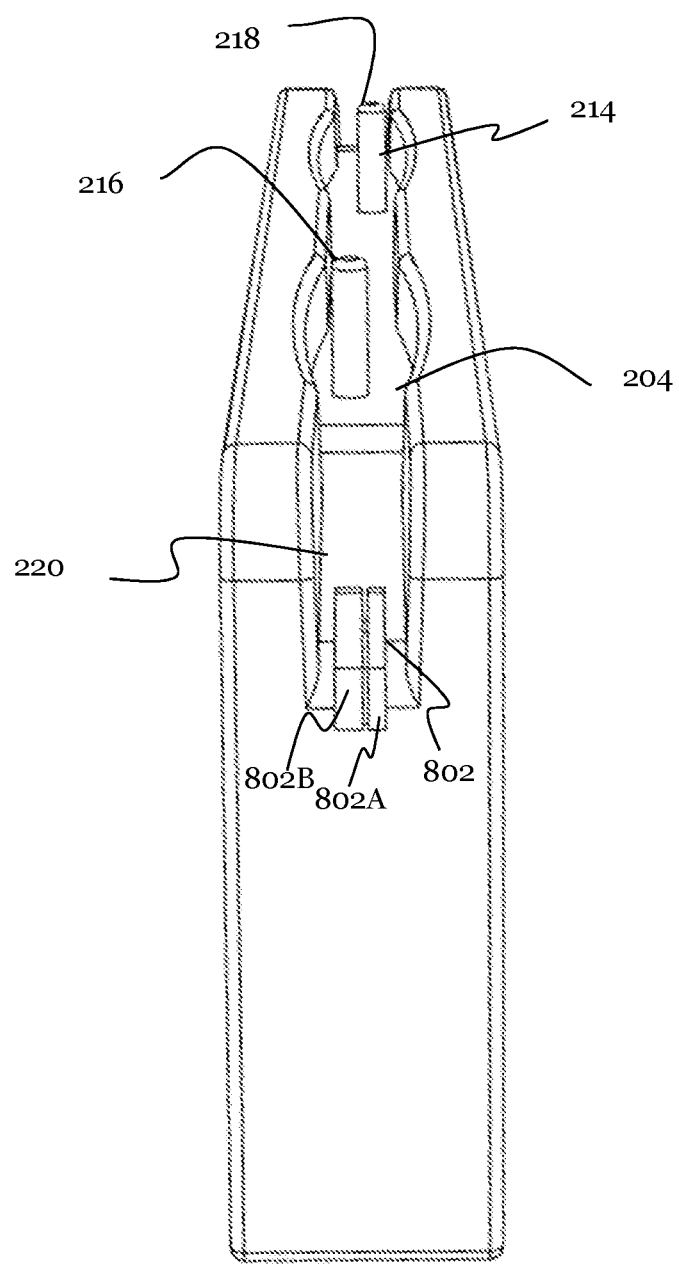
FIG. 8 depicts a view from the exit of the channel of an optical-fiber separation tool of an embodiment.

FIG. 8 depicts a view from the exit 220 of the channel 204 of an optical-fiber separation tool 200 of an embodiment.

In various embodiments, the optical-fiber separation tool 200 may also include an exit guideway 802. The exit guideway 802 may include a first exit track 802A and a second exit track 802B. The first exit track 802A may be sized to accommodate a smaller section of ribbon 100 than the channel 204 and allow for additional separation. The first exit track 802A may be aligned with the first blade 210. The first exit track 802A may be sized to correspond with the size of the first track 702A of the guideway 702. A ribbon may be simultaneously fitted into both the first exit track 802A and the first track 702A to facilitate separation of the ribbon into smaller sections. A two-fiber ribbon may be fitted into both the first track 702A and the first exit track 802A and conveyed through the channel 204 thereby slicing bonding material 140 connecting the two strands of the ribbon. Again, in various embodiments, each of the first exit track 802A and the first track 702A may be sized to accommodate other sizes of ribbons.

In various embodiments, the second exit track 802B may be sized to accommodate a smaller section of ribbon 100 than the channel 204 and allow for additional separation. The second exit track 802B may be aligned with the second blade 212. The second exit track 802B may be sized to correspond to the size of the second track 702B of the guideway 702. A ribbon may be simultaneously fitted into both the second exit track 802B and the second track 702B to facilitate separation of the ribbon into smaller sections. A four-fiber ribbon may be fitted into both the second track 702B and the second exit track 802B and conveyed through the channel 204 thereby slicing bonding material 140 connecting the two center adjacent strands of the ribbon dividing the ribbon into two, two-fiber sections. Again, in various embodiments, each of the first exit track 802A and the first track 702A may be sized to accommodate other sizes of ribbons.

It may be desirable to have a means to secure the alignment of the ribbon in the channel 204 after it has been fitted into the channel. This may be accomplished, in very embodiments, with a lid for the channel 204.

Figure 9:
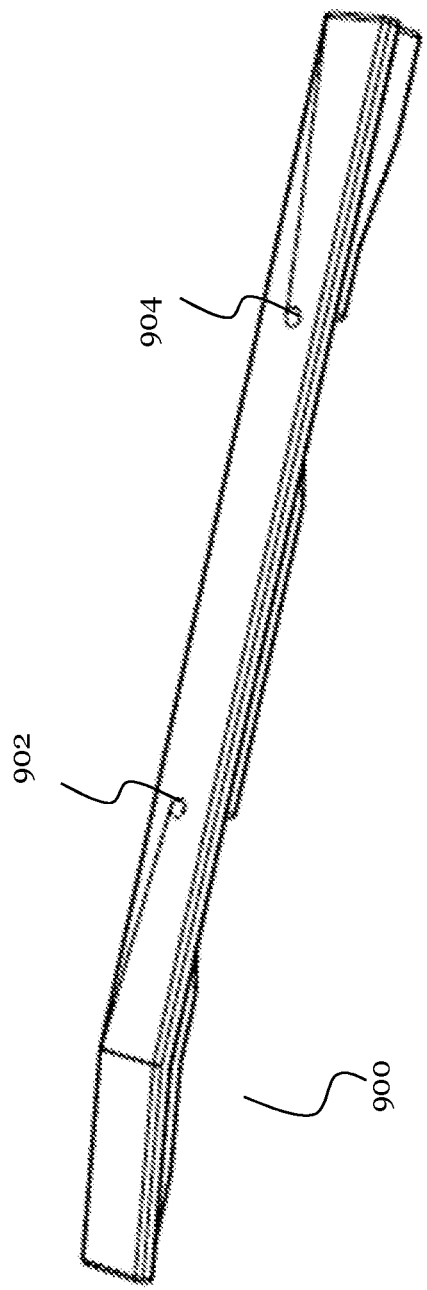
FIG. 9 depicts an embodiment of a lid for an optical-fiber separation tool of an embodiment.

FIG. 9 depicts an embodiment of a lid 900 for an optical-fiber separation tool 200 of an embodiment.

In various embodiments, the optical-fiber separation tool 200 may further comprise a lid 900. A lid 900 may be advantageous to apply pressure to a ribbon in the channel 204 of an optical-fiber separation tool 200 to maintain the alignment of the ribbon in the channel 204. A lid 900 may also be desirable to provide a surface for a user to grip the optical-fiber separation tool 200 when running the optical-fiber separation tool 200 along a ribbon to separate optical fibers of the ribbon. In various embodiments, the lid may keep the ribbon aligned on the tool face without pressure on the ribbon.

In various embodiments, the lid 900 may comprise a first aperture 902 and second aperture 904. The first aperture 902 and the second aperture 904 may promote a tight fit between the body 202 and the lid by allowing the first guide post 214 to be inserted through the first aperture 902 and the second guide post 216 to be inserted through second aperture 904. This may help hold the lid 900 in place. This also may allow a firm fit between the lid 900 and the body 202. However, other means may be used to hold the lid 900 in place. In various embodiments, the lid 900 may be affixed to the body 202 with a hinge.

Figure 10:
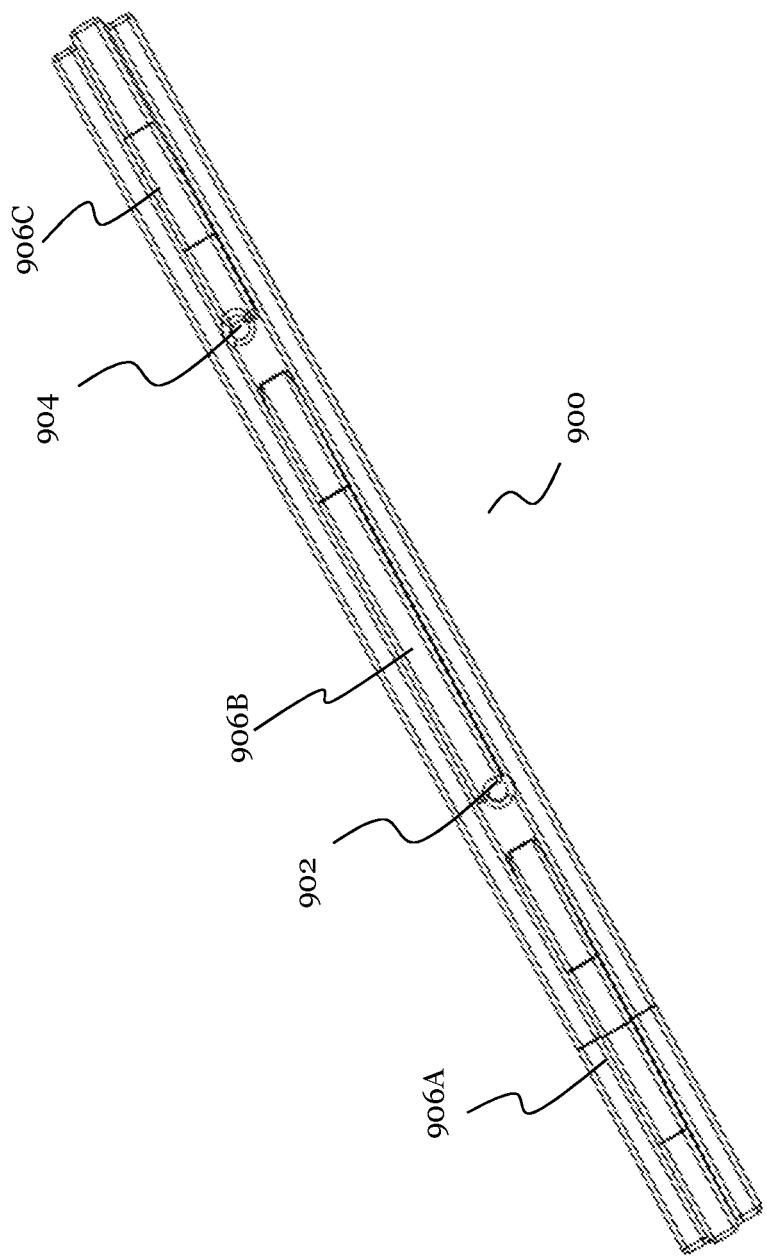
FIG. 10 depicts a view from the underside of a lid of an embodiment.

FIG. 10 depicts a view from the underside of a lid 900 of an embodiment.

The lid 900 may comprise fins to fit in the channel 204 when the lid 900 is coupled with the body 202 of the optical-fiber separation tool 200. The lid 900 may comprise a first fin 906A, a second fin 906B, and a third fin 906C. In various embodiments, the lid 900 may comprise more or less fins. The fins may close an open side of the channel 204 to hold a ribbon in place after it has been fitted in the channel 204. In various embodiments the fins may make contact with the ribbon while in the channel 204 to provide pressure to hold the ribbon in alignment in the channel 204. In various embodiments, when the lid 900 is coupled with the body 202, the fins may allow space between a ribbon fitted into a channel 204, and the fins may prevent the ribbon from losing alignment in the channel 204 as the ribbon is conveyed through the channel 204.

Figure 11:
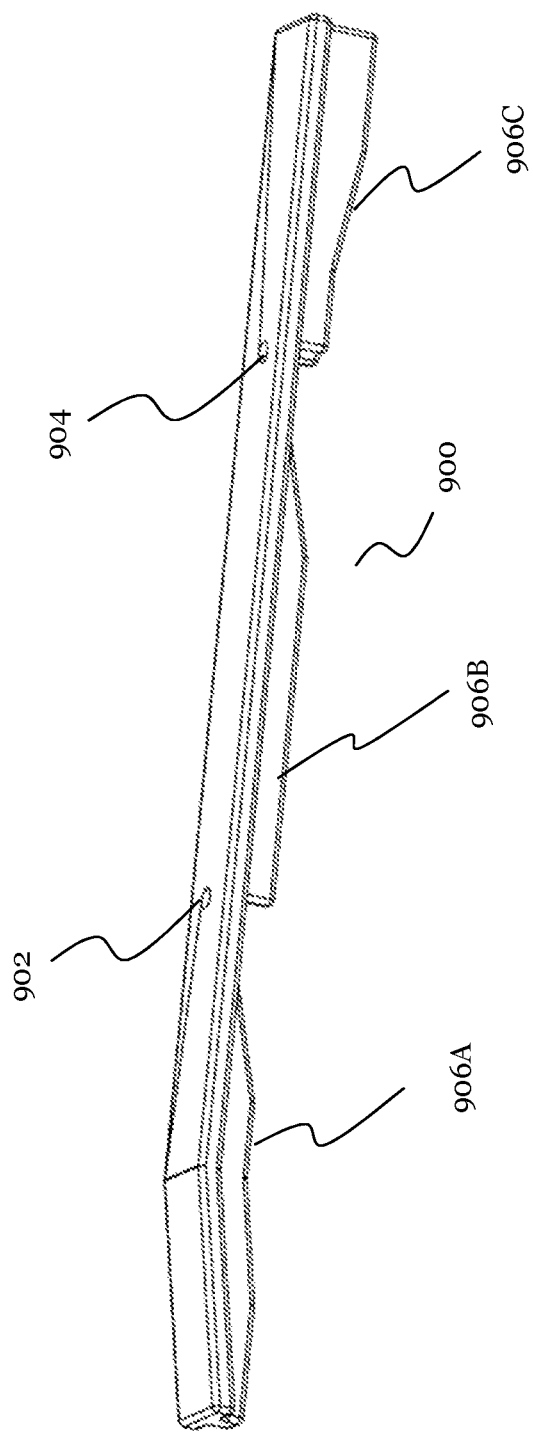
FIG. 11 depicts a perspective view of a lid of an embodiment.

FIG. 11 depicts a perspective view of a lid 900 of an embodiment.

FIG. 11 shows the extensions of the first fin 906A, the second fin 906B and the third fin 908B. The dimensions of the fin may correspond to the dimensions of the channel 204 to allow a secure fit with the channel 204.

Figure 12:
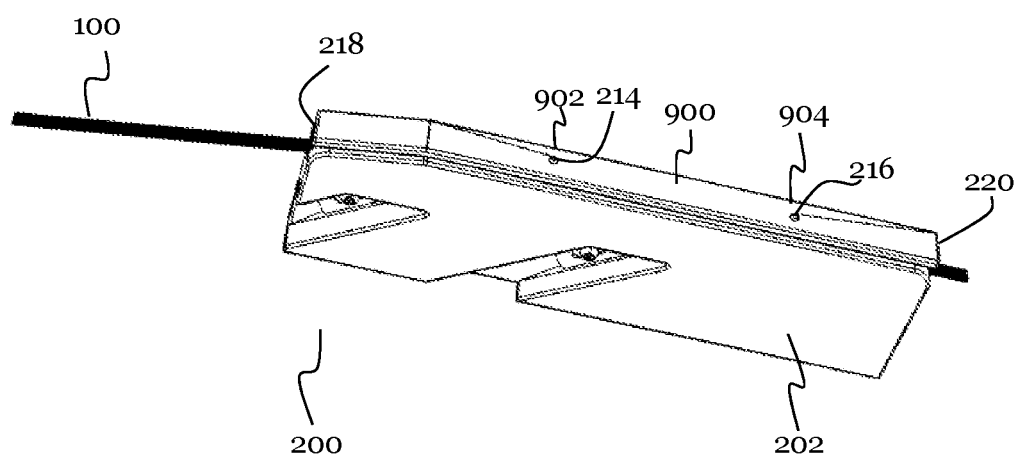
FIG. 12 depicts the optical-fiber separation tool 200 fitted with a lid of an embodiment.

FIG. 12 depicts the optical-fiber separation tool 200 fitted with a lid 900 of an embodiment.

The lid 900 may close an open side of the channel 204 when affixed to the body 202. The first guide post 214 may fit in the first aperture 902 and the second guide post 216 may fit in the second aperture 904.

FIG. 13 is a flow chart illustrating a method 1300 to separate an optical ribbon into a first portion, a second portion, and a third portion of an embodiment.

In various embodiments the method 1300 may comprise at a step 1302, fitting the optical fiber ribbon into a channel of a fiber-separation tool around a first blade located in the channel and a second blade located in the channel; at a step 1304, arranging the optical fiber ribbon in the channel so the first blade is positioned between the first portion and the second portion and the second blade is positioned between the second portion of the optical fiber and the third portion of the optical fiber; and at a step 1306 conveying the optical fiber ribbon lengthwise through the channel to slice through a bonding material binding the first portion of the optical fiber ribbon to the second portion of the optical fiber ribbon and to slice through a bonding material binding the second portion of the optical fiber ribbon to the third portion of the optical fiber ribbon.

In various embodiments, the method 1300 may further comprise securing a lid over an opening of the channel to maintain an alignment of the optical fiber ribbon in the channel as the optical fiber ribbon is conveyed through the channel.

In various embodiments, the method 1300 may further comprise, wherein the optical fiber ribbon comprises 12 optical fibers.

In various embodiments, the method 1300 may further comprise wherein the first portion comprise 4 optical fibers, the second portion comprises 4 optical fibers, and the third portion comprises 4 optical fibers.

Example 1. A fiber-separation tool including: a body; a channel disposed on a face of the body, the channel being defined by a first sidewall and a second sidewall opposite the first sidewall, the channel being configured to receive an optical fiber ribbon including a plurality of optical fibers bonded parallel to each other; and a first blade disposed in the channel with a cutting edge of the first blade being disposed at a first distance from the first sidewall and the cutting edge being disposed at a second distance from the second sidewall, the first blade being configured to separate the optical fiber ribbon into a first portion including a first number of optical fibers of the plurality of optical fibers and a second portion including a second number of optical fibers as the optical fiber ribbon is conveyed from an entrance of the channel to an exit of the channel, a width of the first portion being approximately equal to the first distance and a width of the second portion being approximately equal to the second distance.

Example 2. The fiber-separation tool of Example 1, further including a lid configured to fit into the channel to secure an alignment of the optical fiber ribbon in the channel.

Example 3. The fiber-separation tool of Example 1 or Example 2, wherein the first blade is removably attached to the fiber-separation tool.

Example 4. The fiber-separation tool of Examples 1-3, further including a first guide post located between the first blade and the exit of the channel, the first guide post being aligned with the first blade along a longitudinal axis of the channel.

Example 5. The fiber-separation tool of Examples 1-4, a second blade disposed in the channel with a cutting edge of the second blade being disposed at a third distance from the first sidewall and the cutting edge being disposed at a fourth distance from the second sidewall; and wherein the second blade is configured to separate a third portion including a third number of optical fibers of the plurality of optical fibers from the second portion as the optical fiber ribbon is conveyed from the entrance of the channel to the exit of the channel, a width of the third portion being approximately equal to the third distance.

Example 6. The fiber-separation tool of Examples 1-5, wherein the first distance is approximately equal to the third distance and the second distance is approximately equal to the fourth distance.

Example 7. The fiber-separation tool of Examples 1-6, wherein the plurality of optical fibers includes 12 optical fibers, the first portion includes 4 optical fibers, the second portion includes 4 optical fibers after the third portion has been separated from the second portion, and the third portion includes 4 optical fibers.

Example 8. The fiber-separation tool of Examples 1-7, wherein the plurality of optical fibers includes 24 optical fibers, the first portion includes 8 optical fibers, the second portion includes 8 optical fibers after the third portion has been separated from the second portion, and the third portion includes 8 optical fibers.

Example 9. The fiber-separation tool of Examples 1-8, wherein the first blade and the second blade are offset from each other on a longitudinal axis of the channel and the first blade and the second blade are offset from each other on a lateral axis of the channel.

Example 10. The fiber-separation tool of Examples 1-9, further including a second guide post located between the second blade and the exit of the channel, the second guide post being aligned with the second blade along a longitudinal axis of the channel.

Example 11. The fiber-separation tool of Examples 1-10, further including a first guideway including a first track aligned with the first blade.

Example 12. The fiber-separation tool of Examples 1-11, wherein the first guideway further includes a second track aligned with the second blade.

Example 13. A method to separate an optical fiber ribbon including a plurality of optical fibers into a first portion, a second portion, and a third portion, the method including: fitting the optical fiber ribbon into a channel of a fiber-separation tool around a first blade located in the channel and a second blade located in the channel; arranging the optical fiber ribbon in the channel so the first blade is positioned between the first portion and the second portion and the second blade is positioned between the second portion of the optical fiber and the third portion of the optical fiber; and conveying the optical fiber ribbon lengthwise through the channel to slice through a bonding material binding the first portion of the optical fiber ribbon to the second portion of the optical fiber ribbon and to slice through a bonding material binding the second portion of the optical fiber ribbon to the third portion of the optical fiber ribbon.

Example 14. The method of Example 13, further including securing a lid over an opening of the channel to maintain an alignment of the optical fiber ribbon in the channel as the optical fiber ribbon is conveyed through the channel.

Example 15. The method of Example 13 or Example 14, wherein the optical fiber ribbon includes 12 optical fibers.

Example 16. The method of Examples 13-15, wherein the first portion includes 4 optical fibers, the second portion includes 4 optical fibers after the third portion has been separated from the second portion, and the third portion includes 4 optical fibers.

Example 17. A fiber-separation tool including: a body; a channel disposed on a face of the body, the channel being defined by a first sidewall and a second sidewall opposite the first sidewall, the channel being configured to receive an optical fiber ribbon including a plurality of optical fibers bonded parallel to each other; a first blade disposed in the channel with a cutting edge of the first blade being disposed at a first distance from the first sidewall and the cutting edge being disposed at a second distance from the second sidewall, the first blade being configured to separate the optical fiber ribbon into a first portion including a first number of optical fibers of the plurality of optical fibers and a second portion including a second number of optical fibers as the optical fiber ribbon is conveyed from an entrance of the channel to an exit of the channel, a width of the first portion being approximately equal to the first distance and a width of the second portion being approximately equal to the second distance; a second blade disposed in the channel with a cutting edge of the second blade being disposed at a third distance from the first sidewall and the cutting edge being disposed at a fourth distance from the second sidewall, the second blade being configured to separate a third portion including a third number of optical fibers of the plurality of optical fibers from the second portion as the optical fiber ribbon is conveyed from the entrance of the channel to the exit of the channel, a width of the third portion being approximately equal to the third distance; and a lid configured to fit into the channel to secure an alignment of the optical fiber ribbon in the channel.

Example 18. The fiber-separation tool of Example 17, wherein the first blade is removably attached to the fiber-separation tool.

Example 19. The fiber-separation tool of Example 17 or Example 18, wherein the second blade is removably attached to the fiber-separation tool.

Example 20. The fiber-separation tool of Example 17-19, further including a first guideway including a first track aligned with the first blade and a second track aligned with the second blade.

Example 21. The fiber-separation tool of Example 17-20, wherein the first blade and the second blade are offset from each other on a longitudinal axis of the channel and the first blade and the second blade are offset from each other on a lateral axis of the channel.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

It is therefore intended that the appended claims encompass any such modifications or embodiments.

What is claimed is:

1. A fiber-separation tool comprising:
   a body;
   a channel disposed on a face of the body, the channel being defined by a first sidewall and a second sidewall opposite the first sidewall, the channel being configured to receive an optical fiber ribbon comprising a plurality of optical fibers bonded parallel to each other; and
   a first blade disposed in the channel with a cutting edge of the first blade being disposed at a first distance from the first sidewall and the cutting edge being disposed at a second distance from the second sidewall, the first blade being configured to separate the optical fiber ribbon into a first portion comprising a first number of optical fibers of the plurality of optical fibers and a second portion comprising a second number of optical fibers as the optical fiber ribbon is conveyed from an entrance of the channel to an exit of the channel, a width of the first portion being approximately equal to the first distance and a width of the second portion being approximately equal to the second distance, wherein a first guide post is located between the first blade and the exit of the channel, the first guide post being aligned with the first blade along a longitudinal axis of the channel, the first guide post being located at a position in the channel relative to the cutting edge of the first blade such that the first guide post, the first sidewall, the second sidewall, and the channel expose a bonding material along a binding between a first portion of the optical fiber ribbon and a second portion of the optical fiber ribbon, by elongating without breaking the bonding material, before the bonding material reaches the cutting edge of the first blade.

2. The fiber-separation tool of claim 1, further comprising a lid configured to fit into the channel to secure an alignment of the optical fiber ribbon in the channel.

3. The fiber-separation tool of claim 1, wherein the first blade is removably attached to the fiber-separation tool.

4. The fiber-separation tool of claim 1, further comprising:
   a second blade disposed in the channel with a cutting edge of the second blade being disposed at a third distance from the first sidewall and the cutting edge being disposed at a fourth distance from the second sidewall; and
   wherein the second blade is configured to separate a third portion comprising a third number of optical fibers of the plurality of optical fibers from the second portion as the optical fiber ribbon is conveyed from the entrance of the channel to the exit of the channel, a width of the third portion being approximately equal to the third distance.

5. The fiber-separation tool of claim 4, wherein the first distance is approximately equal to the third distance and the second distance is approximately equal to the fourth distance.

6. The fiber-separation tool of claim 4, wherein the first blade and the second blade are offset from each other on a longitudinal axis of the channel and the first blade and the second blade are offset from each other on a lateral axis of the channel.

7. The fiber-separation tool of claim 4, further comprising a second guide post located between the second blade and the exit of the channel, the second guide post being aligned with the second blade along a longitudinal axis of the channel.

8. The fiber-separation tool of claim 7, wherein the second guide post is positioned in the channel relative to the cutting edge of the second blade such that the second guide post, the first sidewall, the second sidewall, and the channel expose a second bonding material along a second binding between the third portion of the optical fiber ribbon and the second portion of the optical fiber ribbon, by elongating without breaking the second bonding material, before the second bonding material reaches the cutting edge of the second blade.

9. The fiber-separation tool of claim 4, further comprising a first guideway comprising a first track aligned with the first blade.

10. The fiber-separation tool of claim 9, wherein the first guideway further comprises a second track aligned with the second blade.

11. A method to separate an optical fiber ribbon comprising a plurality of optical fibers into a first portion, a second portion, and a third portion, the method comprising:
    fitting the optical fiber ribbon into a channel of a fiber-separation tool around a first blade located in the channel and a second blade located in the channel;
    arranging the optical fiber ribbon in the channel so the first blade is positioned between the first portion and the second portion and the second blade is positioned between the second portion of the optical fiber and the third portion of the optical fiber; and
    conveying the optical fiber ribbon lengthwise through the channel to slice through a first bonding material binding the first portion of the optical fiber ribbon to the second portion of the optical fiber ribbon and to slice through a second bonding material binding the second portion of the optical fiber ribbon to the third portion of the optical fiber ribbon, wherein a first guide post and the channel aid the movement of the optical fiber ribbon through the channel and direct the optical fibers apart to expose the first bonding material, by elongating without breaking the first bonding material along the binding, before reaching a cutting edge of the first blade, and wherein a second guide post and the channel aid the movement of the optical fiber ribbon through the channel and direct the optical fibers apart to expose the second bonding material, by elongating without breaking the second bonding material along the binding, before reaching a cutting edge of the second blade.

12. The method of claim 11, further comprising:
    securing a lid over an opening of the channel to maintain an alignment of the optical fiber ribbon in the channel as the optical fiber ribbon is conveyed through the channel.

13. The method of claim 11, wherein the optical fiber ribbon comprises 12 optical fibers.

14. The method of claim 13, wherein the first portion comprises 4 optical fibers, the second portion comprises 4 optical fibers after the third portion has been separated from the second portion, and the third portion comprises 4 optical fibers.

15. A fiber-separation tool comprising:
    a body;
    a channel disposed on a face of the body, the channel being defined by a first sidewall and a second sidewall opposite the first sidewall, the channel being configured to receive an optical fiber ribbon comprising a plurality of optical fibers bonded parallel to each other;
    a first blade disposed in the channel with a cutting edge of the first blade being disposed at a first distance from the first sidewall and the cutting edge being disposed at a second distance from the second sidewall, the first blade being configured to separate the optical fiber ribbon into a first portion comprising a first number of optical fibers of the plurality of optical fibers and a second portion comprising a second number of optical fibers as the optical fiber ribbon is conveyed from an entrance of the channel to an exit of the channel, a width of the first portion being approximately equal to the first distance and a width of the second portion being approximately equal to the second distance;

a second blade disposed in the channel with a cutting edge of the second blade being disposed at a third distance from the first sidewall and the cutting edge being disposed at a fourth distance from the second sidewall, the second blade being configured to separate a third portion comprising a third number of optical fibers of the plurality of optical fibers from the second portion as the optical fiber ribbon is conveyed from the entrance of the channel to the exit of the channel, a width of the third portion being approximately equal to the third distance, wherein a first guide post is located between the first blade and the exit of the channel, the first guide post being aligned with the first blade along a longitudinal axis of the channel, the first guide post being located at a position in the channel relative to the cutting edge of the first blade and the first sidewall and the second sidewall to expose, by elongating without breaking, a bonding material binding the first portion of the optical fiber ribbon to the second portion of the optical fiber ribbon before reaching the cutting edge of the first blade; and a lid configured to fit into the channel to secure an alignment of the optical fiber ribbon in the channel.

16. The fiber-separation tool of claim 15, wherein the first blade is removably attached to the fiber-separation tool.

17. The fiber-separation tool of claim 15, wherein the second blade is removably attached to the fiber-separation tool.

18. The fiber-separation tool of claim 15, further comprising a first guideway comprising a first track aligned with the first blade and a second track aligned with the second blade.

19. The fiber-separation tool of claim 15, wherein the first blade and the second blade are offset from each other on a longitudinal axis of the channel and the first blade and the second blade are offset from each other on a lateral axis of the channel.

20. The fiber-separation tool of claim 15, further comprising a second guide post located between the second blade and the exit of the channel, the second guide post being aligned with the second blade along a longitudinal axis of the channel, the second guide post being positioned in the channel relative to the cutting edge of the second blade such that the second guide post, the first sidewall, the second sidewall, and the channel expose a second bonding material along a second binding between the third portion of the optical fiber ribbon and the second portion of the optical fiber ribbon, by elongating without breaking the second bonding material, before the second bonding material reaches the cutting edge of the second blade.

* * * * *